United States Patent [19]
Norburn

[11] 3,791,209
[45] Feb. 12, 1974

[54] HIGH TEMPERATURE RECORDING LANCE

[76] Inventor: William Carl Norburn, 1201 N. 35th St., Allentown, Pa. 18104

[22] Filed: Nov. 11, 1971

[21] Appl. No.: 197,869

[52] U.S. Cl. .................................. 73/359, 136/234
[51] Int. Cl. ........................... G01k 7/02, G01k 1/14
[58] Field of Search............. 73/359, 17 R; 136/234

[56] References Cited
UNITED STATES PATENTS

| | | | |
|---|---|---|---|
| 3,559,452 | 2/1971 | Perbix | 73/17 R |
| 3,455,164 | 7/1969 | Boyle | 73/359 |
| 3,055,961 | 9/1962 | Robertson | 136/234 |

Primary Examiner—Richard C. Queisser
Assistant Examiner—Denis E. Corr

[57] ABSTRACT

An expendable recording lance or probe adapted for immersion in hot baths such as molten metals or salts and for mounting over the end of an elongated lance holder containing wires for interconnecting the lance with an electrical device for converting electrical information obtained from the lance to useful information. The lance includes an elongated hollow tube carrying a recording device at its front end and covered by a metallic sheath projecting beyond the front end of the tube over the recording device to protect the recording device as the lance is plunged into a hot bath.

2 Claims, 5 Drawing Figures

PATENTED FEB 12 1974  3,791,209

HIGH TEMPERATURE RECORDING LANCE

This invention relates to an expendable immersion type lance or probe having a recording nose and adapted to be mounted on the end of a rear elongated holder for supporting and manipulating the lance as it is immersed in a hot bath. The rear lance holder contains wires connecting the recording nose to conventional recording apparatus for receiving the electrical signal created by the recording nose and converting it to useful information. The lance is intended to be rapidly destroyed by the hot bath as it records information and is withdrawn before the lance holder is damaged. This type of lance can be used to measure information such as temperature conditions of hot baths of molten metals, salts and other materials.

Conventional recording lances of the expendable type cause splashing of molten metal when initially immersed in a molten bath. Such splashing is undesirable and dangerous to personnel handling the lance and to anyone else near the bath. Non-splashing lances have been made but they are relatively expensive, heavy and are easily broken.

The principal object of this invention is to provide an improved recording lance that eliminates the splashing of conventional lances, is relatively inexpensive, lighter than previous non-splashing lances and will withstand rough handling without being easily broken.

In general, the objects of this invention are attained in a lance including a conventional inner tube made from materials such as cardboard and encasing said tube in a thin sheath that covers the inner tube entirely and extends forward to form a nose covering the recording head of the forward end of the lance. The sheath can be composed of thin materials such as metal that will quickly burn away in the nose area of the lance to allow the bath to contact the recording head while protecting the tube and head during shipment and storage of the lance and preventing the lance from splashing the bath during initial entry of the lance into the high temperature bath.

BRIEF DESCRIPTION OF DRAWINGS

The invention is described in connection with the accompanying drawing wherein.

Figure 1:
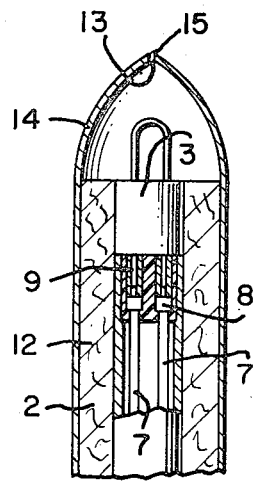
FIG. 1 is an axial section of an embodiment of expendable lance or probe for measuring information while immersed in a hot bath.

The recording lance 1 shown in FIG. 1 includes an inner carboard tube 2 carrying an electrical recording head 3 at its forward end, which is shown as a thermocouple but might be other types of devices for sensing information when plunged in a high temperature bath. The recording head 3 is firmly mounted in the forward end of the tube 2. The tube 2 is adapted to be mounted over the forward end of a conventional lance holder 4 that includes a rear part 5 and a forward part 6 adapted to fit snugly within the tube 2. The lance holder 4 contains a pair of wires 7 leading to a socket 8 at its forward end adapted to receive electrical terminals 9 projecting rearwardly from the recording head 3.

The wires 7 connect the recording head 3 to an electrical device (not shown) for converting electrical signals from the recording head 3 to useful information. In general, the lance 1 is intended to be used once for a recording and is destroyed during the recording time which normally is very short, less than one minute. The lance holder 4 is not intended to be destroyed and will be used with many lances 1. Hence, the lance 1 should be sufficient to protect the lance holder 4 during the time it is in a high temperature bath, such as a bath of molten steel. Normally, the lance 1 will be in a molten bath for 10 to 15 seconds and then withdrawn. Although, I say that generally the lance 1 will only be used once, it is possible that in certain situations, it can be used more than once and, therefore, I do not want to be limited to a lance that is only used once. Up to this point, the structure of the lance 1 that has been described is conventional and well known.

One of the features of my invention is the idea of encasing the tube 2 in a thin metallic sheath 12 extending the length of the tube 2 and projecting a short distance forwardly of the tube 2 as a nose 14 which is pinched together at 15 to form a sealed cover over the recording head 3. In general, the metallic sheath will have a thickness from 0.1 to 0.01 inches. It must be thin enough to burn away rapidly, say, in two to three seconds, as the lance 1 is plunged into a hot bath, in order for the hot bath to reach the sensing member in the recording head 3, while being substantial enough to protect the recording head 3 during the entry of the lance into the hot bath. For example, if used in a molten metal bath, the nose 14 must protect the recording head 3 while it passes through the slag on top of the molten bath. The nose 14 contains a small hole 13 at its end to equalize the internal pressure with external pressure as the lance is plunged into the molten bath.

In addition, the nose 14 protects the recording head 3 while the lance is being handled, stored and shipped prior to use. Furthermore, the nose 14 aids in protecting the front end of the tube 2 against the entry of moisture while stored prior to use. In general, the sheath 12 is steel for lances used in molten metal baths.

In the past, it has been the practice to use cardboard or pressed fiber board for the tube 2 because it is inexpensive, light in weight and it will resist the heat of a molten bath long enough to obtain a measurement and withdraw the lance without damaging the lance holder 4. However, it has been found that it is almost impossible to prevent the cardboard tube 2 from absorbing some moisture. This moisture causes a molten metal bath to splash when the tube is initially plunged into the bath. My sheath 12 prevents this splashing by preventing the molten bath from reaching the cardboard for long enough to eliminate splashing. The metal sheath 12 also helps to protect the cardboard tube 2 from absorbing moisture during storage. Finally, the sheath 12 is used to form the protective nose 14 that protects the recording head 3 during the entry of the lance 1 into a molten bath.

One method of placing the sheath 12 on the cardboard tube 2 is by slipping it over the tube 2 with a fairly snug fit to insure that it protects the tube 2 against moisture.

The metal sheath 12 provides still another benefit. It is believed that if the cardboard tube 2 is heated to be partially charred, it will drive off any moisture that may be present in the cardboard and the charred cardboard will be a better heat insulator. By being charred, it is turned to a partial carbon material and carbon is well known for its heat insulating and resisting properties. After the tube 2 is encased in the metal sheath 12, the lance can be heated to char the tube 2 without damaging the metal sheath 12, which then will protect and hide the charred surface of the tube 2 during handling and shipment prior to use. The temperatures and heating time of the lance, sufficient to char the tube 2, will vary depending on many variables such as the composition of the cardboard, the amount of moisture present in it, the thickness of the metal sheath 12, etc. In one case, I found that a satisfactory charred lance could be provided by placing it in a furnace heated to 1000° Fahrenheit for 5 minutes.

Figure 2:
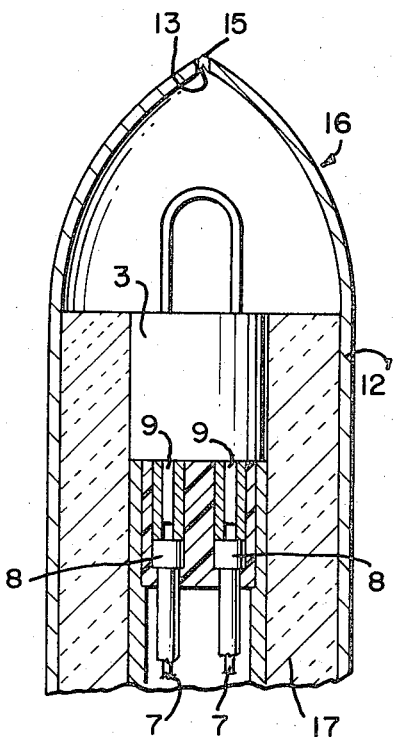
FIGS. 2 and 3 are fragmentary axial sections showing alternate embodiments of the construction of the inner tube.

The embodiment 16 shown FIG. 2 substitutes a ceramic tube 17 for the cardboard tube 2 in FIG. 1. This embodiment may be desirable for use in certain types of baths. However, the ceramic tube 17 is more easily broken during storage although the outer sheath 12 offers it much protection.

Figure 3:
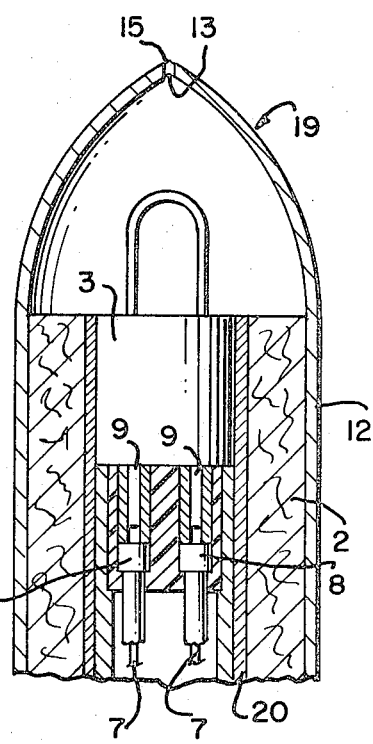

The embodiment 19 shown in FIG. 3 is the same as FIG. 1 except it also contains a thin metal tube 20 on the inside of the cardboard tube 2. This embodiment 19 while being more expensive than the lance 1 of FIG. 1 may be desirable in some cases to offer further protection to the lance holder 4. The inner tube 20 protects the lance holder 4 against the heat that might pass through undetected cracks in the tube 2. Such cracks might develop during rough handling of the lance prior to use.

Figure 4:
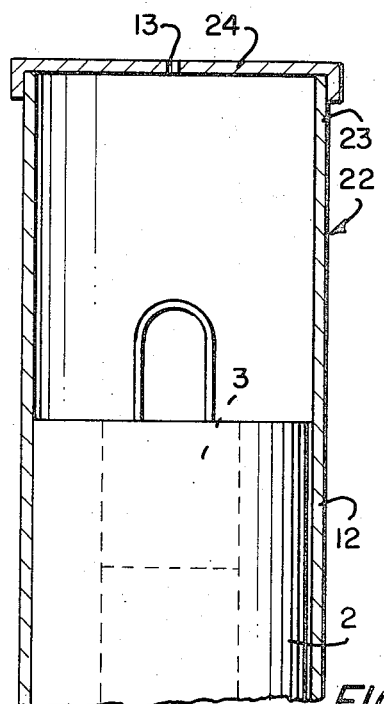
FIG. 4 is an axial section showing another embodiment of the front end of the lance.

In the FIG. 4 embodiment 22, the metal sheath 12 is carried forward to form a cylindrical extension providing a nose 23. The nose 23 can be capped by a cap 24 for sealing the nose during shipment and storage prior to use. When the lance embodiment 22 is initially plunged into a high temperature bath the nose 23 is designed to burn away rapidly in the same way as with the nose 14 of the FIG. 1 embodiment.

Figure 5:
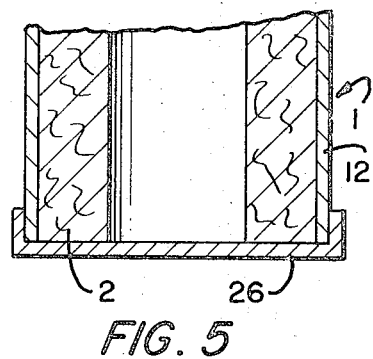
FIG. 5 is an axial section of the rear end of the lance showing the use of a shipping cap to protect the lance.

In FIG. 5, the rear end of the lance 1 is shown closed by a cap 26 during shipment to protect against the entry of moisture into the cardboard prior to use.

While several embodiments of the invention have been specifically disclosed in the drawing and described in the description, the invention is not limited merely to these embodiments and includes all the variations and embodiments covered by the claims.

I claim:

1. An expendable recording lance adapted for immersion in hot baths and for attachment over the forward end of a conventional elongated lance holder, said lance comprising:

an elongated hollow tube adapted to slidably fit over an elongated lance holder;

an electrical recording device attached to the front end of said tube and connected to wires extending through said tube to a connection with said lance holder; and a relatively thin metallic sheath surrounding said hollow tube and extending rearwardly from said front end over a sufficient length of said tube to at least cover the portion of said hollow tube that is normally immersed in a hot bath to eliminate splashing when said lance is initially immersed in hot baths containing certain materials;

said tube being composed of carbonized cardboard.

2. The lance of claim 1 wherein said carbonized cardboard tube is charred.

* * * * *